Aug. 10, 1948.    K. E. ROLLEFSON    2,446,885
AIRPLANE ENGINE ICE INDICATOR
Filed April 13, 1944    2 Sheets-Sheet 1

INVENTOR.
Karl E. Rollefson
By: Loftus, Moore, Olson & Trexler
attys.

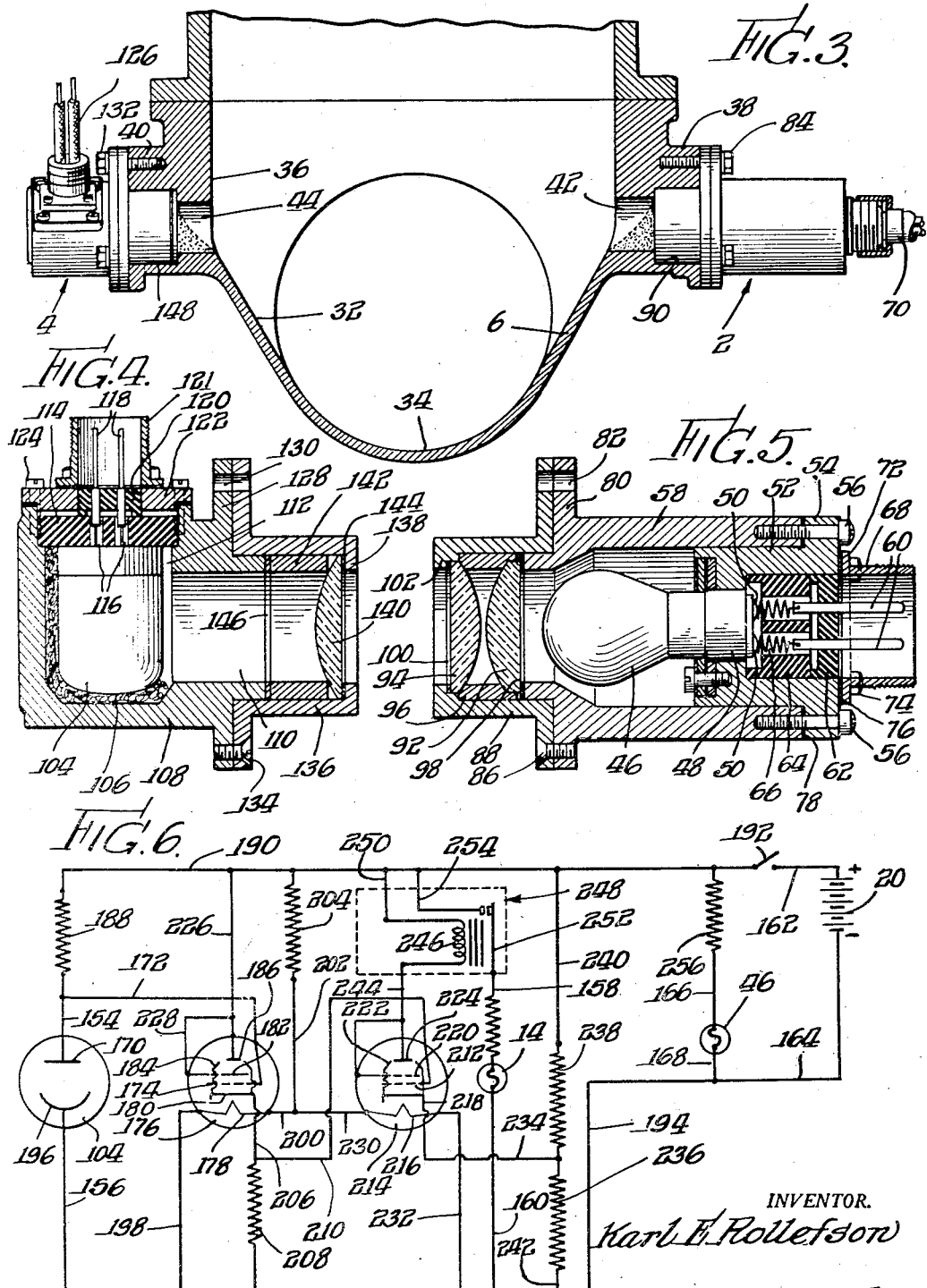

Patented Aug. 10, 1948

2,446,885

UNITED STATES PATENT OFFICE 2,446,885

AIRPLANE ENGINE ICE INDICATOR

Karl E. Rollefson, Evanston, Ill., assignor to The Muter Company, Chicago, Ill., a corporation of Illinois Application April 13, 1944, Serial No. 530,892

5 Claims. (Cl. 177—311)

This invention relates to an airplane engine ice indicator, and more particularly to a device which will give a warning or indication to the airplane pilot of the presence of ice in the carburetor air induction system of the airplane motor. It is well-known that ice forms readily in the carburetor air induction system of an airplane engine to such an extent that in a short period of time it accumulates to a sufficient degree to constitute a real hazard to the continued operation of the engine.

An object of the invention is, accordingly, to provide an indicator controlled by the air induction system of an airplane motor to give a warning to the pilot of the formation of ice in the carburetor air induction system in ample time to permit the pilot to take appropriate measures to prevent further accumulation of ice to the point where the performance of the engine is materially affected.

The invention contemplates the provision of a control system or device particularly adapted for incorporation in the carburetor air induction system of an airplane engine to indicate to the pilot the condition of the air induction system in respect to the formation of ice therein, and/or to operate, or initiate operation of, means to eliminate the ice from the system.

Other and further objects and advantages of the invention will be apparent from the following description when taken in connection with the accompanying drawing, wherein—

Figure 3 is an enlarged, fragmentary view in vertical section taken substantially along the line 3—3 of Figure 1;

Figure 4 is an enlarged view in vertical section of a photocell assembly forming part of the present invention;

Figure 5 is a view in vertical section of the lamp assembly forming part of the invention; and Figure 6 is a schematic diagram of the photocell indicator, control circuit forming part of the present invention.

Figure 1:
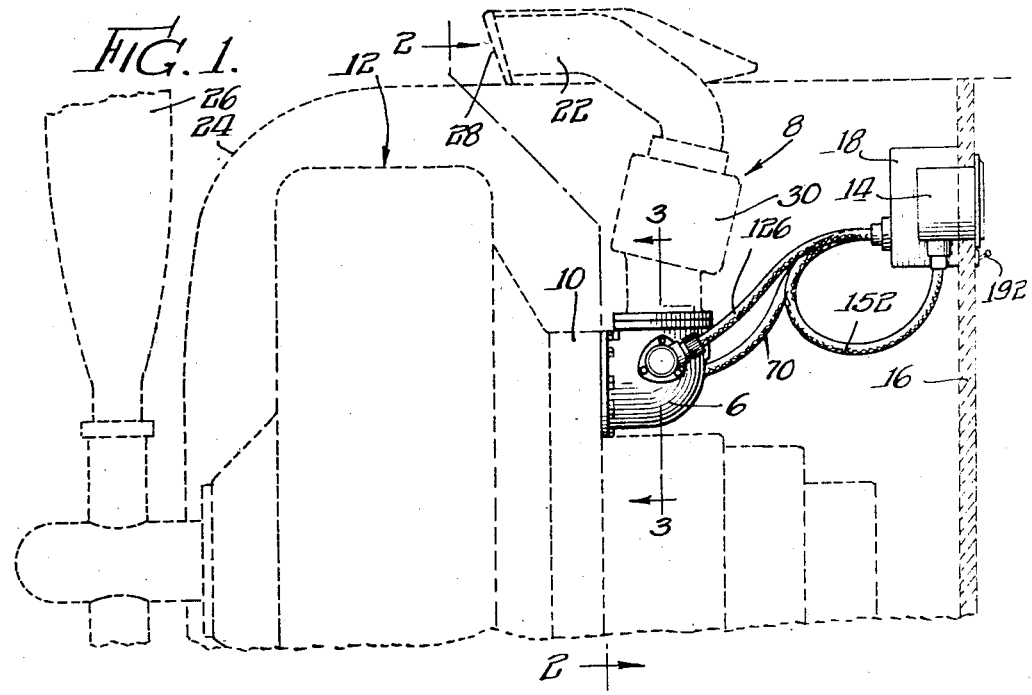
Figure 1 is a fragmentary, diagrammatic view in side elevation of an airplane engine embodying the invention.

The atmospheric conditions under which ice may be formed in the carburetor induction system vary greatly, and extensive research has shown the impossibility of preventing, by design of the parts of the system, the forming of ice under all of those widely varying atmospheric conditions. As is well known, the forming of ice in the air induction system of an airplane engine is one of the most frequent causes of loss of motive power and of motor failure.

The induction system of an airplane engine consists usually of a scoop, an induction carburetor, and a carburetor adapter which connects the carburetor to a supercharger or to the intake system of the engine. Ice may be formed in the induction system by three different processes. When sleet, snow, subcooled liquid droplets, or supersaturated air are present in the atmosphere, their impingement against surfaces that are at temperatures below 32° F., causes the formation of ice on those surfaces. This ice is known as impact ice and usually collects on or near a surface which changes the direction of the air flow, so that the water or ice particles, with a density much greater than the air are carried to the surface with a velocity relative to the air screen. This ice is usually heaviest on the surfaces of the air scoop above the carburetor or upon a screen positioned between the carburetor and the scoop. Ice also is formed in or driven down into the carburetor or the carburetor adapter, restricting the passages in these devices and reducing the flow of air and gas to the motor. The most dangerous impact ice is that which collects on the metering elements of the carburetor, affecting the fuel-air ratio.

Throttle ice is that which is usually formed at or near the throttle when the outside air temperatures are slightly above freezing and the relative humidity is high, or when the motor is operated with the throttle in a partially closed position. Because of the increase in energy of the air flowing past a partially closed throttle, moist air passing through the carburetor is thereby cooled to the extent that the water or water vapor condenses and freezes on the surfaces of the carburetor at or near the throttle. Because of the low capacity of the throttle temperature drop in cooling the metal parts, the maximum temperature at which throttle ice is formed is usually about 37° F. Ice forms in the central part of the air stream at carburetor temperatures above 37° F., but the metal temperatures are then usually too great for the ice to collect on the metal.

As the fuel passes through the induction carburetor system it evaporates after it is introduced into the air stream and induces a cooling effect, which causes the moisture in the air to condense and freeze on the wall or the walls of the system. This is known as fuel evaporation ice, or simply as fuel ice, and is defined as that ice which is formed due to the cooling effect of the fuel evaporating after it is introduced into the air stream. This is the most common form of ice since it occurs most frequently in actual operation, and because it is formed at carburetor temperatures considerably above 32° F. Most of the heat necessary to evaporate the fuel is supplied from the air as it drops in temperature during the process of evaporating the fuel. Fuel evaporation ice may affect air flow by blocking off or seriously restricting the size of the blower throat; may affect the fuel-air ratio by interfering with the flow of the fuel; and affect mixture distribution or the quantity of mixture to individual cylinders by upsetting the fuel flow distribution at the fuel nozzle distributor or by upsetting the air flow distribution in the blower throat.

Ice formed under one or any combination of these conditions may materially reduce the engine performance or cause engine failure. An ice detecting and/or control system must necessarily give accurate indication or accurately affect a control upon the formation of ice anywhere in the carburetor induction system, whether such ice is impact ice, throttle ice, or fuel evaporation ice, or any combination of these at a time prior to the accumulation of ice to an extent sufficient to affect materially the engine performance, or before such ice has accumulated to a sufficient extent that the ice removing system of the engine cannot remove the ice before the engine performance is materially affected or the engine rendered inoperative. Applicant has discovered that surfaces may be provided on which ice may be formed and accumulate to a sufficient extent to operate the indicator control before ice of any type has been formed on any part of the carburetor induction system to a sufficient extent to constitute a hazard to the proper performance and operation of the engine. At the same time the indicator or control is so constituted that it will not give an indication of the presence of ice and affect a control operable to eliminate the ice before a real need exists for removal of the ice, as otherwise there would be unnecessary losses in power and decreases in engine power by the unnecessary operation of the ice removing system.

As shown in the drawings, a preferred form of ice indicating control system embodying the invention may comprise a lamp or light source assembly 2 and a photoelectric lamp or light sensitive cell assembly 4 mounted upon carburetor adapter 6 of the carburetor air induction system 8, the carburetor adapter being mounted on the casing section 10 of the airplane engine 12; an electrically operable lead device, such as an indicator lamp or meter 14 mounted on the instrument panel 16; an amplifier unit 18 which may be mounted in any convenient position as, for example, on the rear of the instrument panel 16; and a battery or other electric current supply unit 20, which may be the usual low voltage battery carried by the airplane.

The carburetor air induction system 8 may comprise the usual means for supplying fuel and air in the proper ratios to the engine cylinders, such, for example, as air scoop 22 of properly streamlined form projecting slightly above the usual cowling 24 and facing the propeller 26, so that air may be forced into the scoop through its mouth 28. The air scoop may be connected directly or by a scoop adapter casting to the carburetor 30, in turn mounted on the carburetor adapter 6. The carburetor adapter 6 comprises a hollow elbow casting having a frustoconical elbow surface 32 diverging in an upward direction from a semi-cylindrical elbow surface 34 and merging into a substantially cylindrical surface 36. The carburetor adapter casting may be formed integrally with diametrically opposed mounting bosses 38 and 40 for the lamp or other light source assembly 2 and the photoelectric or light sensitive assembly 4. Openings or recesses 42 and 44 in the carburetor adapter casting are positioned in diametrically alined relation, and are so located as to extend partly above and partly below the point at which the frustoconical surface 32 merges into the cylindrical surface 36, so that the lower portion of the surface of each opening extends into the path of the air or fuel mixture passing through the carburetor adapter. Applicant has discovered that these openings 42 and 44 so located form chambers in which ice will form whenever conditions of relative humidity and temperature are such that ice, whether impact, throttle, or fuel evaporation, forms anywhere in the carburetor air induction system. Hence, the amount of ice in these chambers at any instant indicates the icing conditions of all parts of the air induction system or the condition of icing which will be reached unless appropriate measures are taken to prevent the accumulation of ice.

The lamp assembly 2 comprises a lamp 46 received in a socket 48, having supply terminals 50, and mounted in the transverse end wall of a cylinder 52 having an annular flange 54 receiving fastening means, as bolts 56, by means of which the cylinder is secured to the housing cylinder 58.

Terminal pins 60, which project from the rear of the cylinder 52, are carried by an insulating disk 62 fitted into the cylinder 52, a spacing disk 64 being interposed between the disk 62 and the end wall of the cylinder 52 and being provided with longitudinal openings receiving the pins 60 and springs 66 forming resilient means establishing electrical connection between the pins 60 and the terminals 50.

An externally threaded sleeve 68 forms a fitting to which the lamp supply cable 70 may be attached and forms a housing for the pins 60 which may be received in the usual openings of the attaching plug carried at the end of the cable 70. This sleeve 68 is formed with a mounting flange 72 receiving bolts 74, by means of which it is secured to the cylinder 52. A sealing gasket 76 is interposed between the mounting flange 72 and the cylinder 52. A sealing gasket 78 may also be interposed between the flange 54 of the cylinder 52 and the end of the cylindrical housing 58. The cylindrical housing 58 is formed with a mounting flange 80 having a plurality of openings as 82 receiving bolts 84 for fastening the housing to the boss 38 of the carburetor adapter casting 6, and having other openings receiving screws 86, by means of which the lamp housing is fastened to a lens housing 88.

The lens housing 88 comprises a cylinder having an external flange apertured to receive the screws 86 and being of external dimension to fit snugly in an opening 90 in the boss 38 and concentric with the chamber formed by the opening 42.

A pair of condensing lenses 92 and 94 are mounted in the lens housing 88 by means of a ring 96, cushioning and sealing washers 98 and 100 being interposed between the inner lens 92 and the end of the cylindrical lamp housing 58 and between the outer lens 94 and a shoulder formed by the internal flange 102 of the lens housing cylinder 88.

The lenses 92 and 94 convert the rays from the lamp 46 into a parallel beam of light projected through the opening 42 transversely of the path of the air or air and fuel mixture. This parallel beam of light passes through the opening 44 into the photoelectric cell assembly 4.

The lamp 46 may be of the type providing light, rich in infra-red rays, and an infra-red filter may be incorporated in the optical system of the lamp assembly, wherein the sensitivity of the ice detector is such that the power of infra-red rays to penetrate vapor mist and to be absorbed by ice or slush to a greater degree than other rays may be usefully employed. Thus, for example, where the ice detector is too sensitive to the presence of a semi-transparent mist when an ordinary lamp is employed, an infra-red ray lamp may be employed as the source of light, and an infra-red filter may be fitted over the lenses, as, for example, by being set into the end of the lens housing.

The photoelectric or light sensitive assembly 4 may comprise a photoelectric or light sensitive cell or tube 104 resting upon a cushioning pad 106 in a cylindrical housing 108, the housing being closed at one end and having bores 110 and 112 forming, respectively, the passage for the light beam and an opening for receiving the photocell. The bore 112 has an enlarged part forming a shoulder, upon which is seated the usual insulated socket 114, which receives the prongs of the photocell in electrically conducting sleeves (not shown), mounted in the socket and connected electrically to other electrically conducting sleeves 116, which receive the prongs 118 carried in an insulating disk 120 fitted in a metal disk 122 fastened as by bolts 124 to an integral flange of the housing 108.

The prongs 118 project into an externally threaded sleeve 121 which receive a companion fitting of a shielded cable 126 and a plug on the end of the cable which has openings to receive the terminal prongs 118. The cylindrical housing 108 is formed with an annular flange 128 having a set of openings 130 which receive bolts 132, by means of which the housing is attached to the boss 40 of the carburetor adapter casting 6, and having other openings receiving screws 134, by means of which lens housing 136 is secured to the housing 108.

The lens housing 136 comprises a cylinder having an apertured, external flange receiving the screws 134, and an annular flange 138 forming a seat for a condensing lens 140 held therein by a lens mounting ring 142 fitted in the cylindrical barrel of the housing 136. A cushioning and sealing washer 144 is interposed between the lens and the flange 138, and a similar washer 146 is interposed between the lens mounting ring and the end of the cylindrical barrel of the housing 108, which is fitted in the cylindrical barrel of the lens housing 136. The cylindrical barrel of the lens housing 136 snugly fits into an opening 148 in the boss 40 and concentric to the recess 44.

An infra-red ray filter between appropriate washer rings may be substituted for the washer 146 to exclude rays other than the infra-red rays from the photoelectric cell housing, in which the photoelectric cell may be of the type having maximum sensitivity to infra-red rays. The lens 140 concentrates the beam of light on the light sensitive surface of the photocell.

Figure 2:
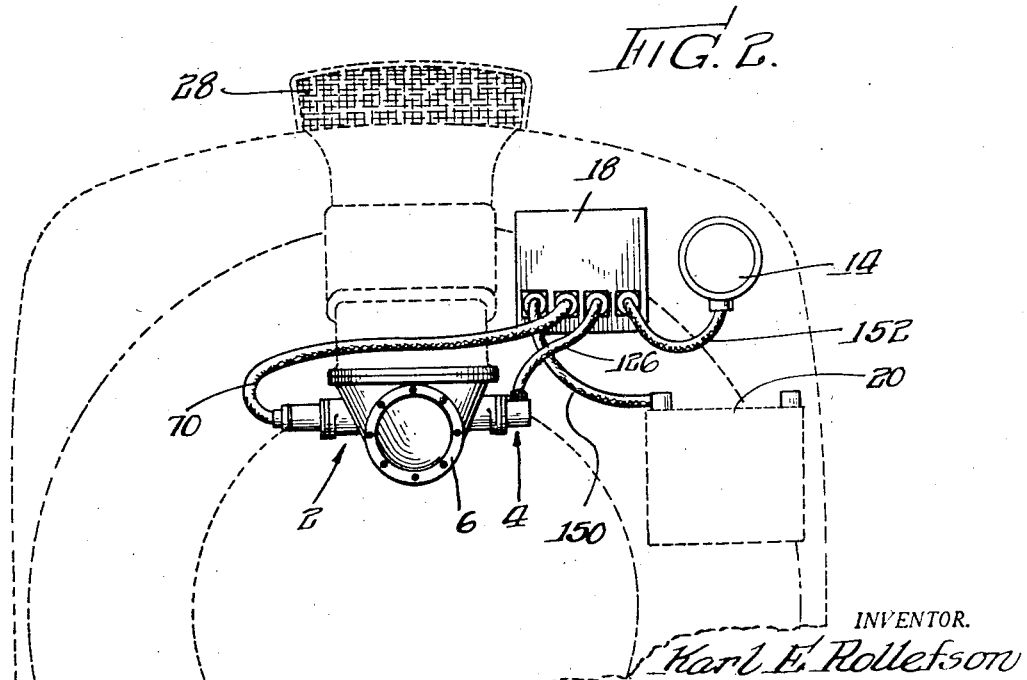
Figure 2 is a fragmentary, diagrammatic view in rear elevation taken along the line 2—2 of Figure 1.

The photoelectric cell 104 is connected by the cable 126 (Figures 1 to 3) to the direct current amplifier unit 18, to which the lamp 46 is connected by the cable 70. The battery 20 is connected to the amplifier unit by cable 150 and the amplifier unit is connected to the indicator lamp 14 by the cable 152. In the schematic diagram of Figure 6 the wires 154 and 156 represent the cable 126; the wires 158 and 160 represent the cable 152; the wires 162 and 164 represent the cable 150; and wires 166 and 168 represent the cable 70. Within the amplifier unit the wire 154, which extends from the anode 170 of the photoelectric cell, is connected by wire 172 to the control grid 174 of a beam power amplifier tube 176 having, in addition to the control grid, a filament 178, a cathode 180, a screen grid 182, beam forming plates 184, and an anode plate 186.

The anode 170 of the photocell is also connected by the wire 154 to one end of a resistor 188 connected at its opposite end through a supply wire 190 to one terminal of a switch 192, the other terminal of which is connected to the wire 162 of the cable from the battery 20. The other wire 164 of the battery cable is connected directly to a supply wire 194. The supply wire 190 constitutes the positive side of the circuit and the supply wire 194 the negative side of the circuit. The cathode 196 of the photoelectric cell is connected directly by the wire 156 to the negative supply wire 194. Filament 178 of tube 176 is connected on one side by wire 198 to the negative supply wire 194, and by wires 200 and 202 to a resistor 204, in turn connected to the positive supply wire 190. The cathode 180 is connected by wire 206 to the self-biasing resistor 208 connected, in turn, to the negative supply wire 194. The cathode is also connected by wire 210 to the control grid 212 of a second beam power amplifier tube 214 having filament 216, cathode 218, control grid 212, screen grid 220, beam forming plates 222, and anode plate 224. The anode 186 of the tube 176 is connected directly by the wire 226 to the positive supply wire 190, and the screen grid 182 is connected to the anode by wire 228. The beam forming plates 184 are, of course, connected to the cathode 180.

Filament 216 of the tube 214 is connected in parallel to the filament 178 of the tube 176 by wire 230 and wire 232. The cathode 218 of tube 214 is connected by wire 234 to one end of the resistor or resistor section 236, which in turn is connected in series with a resistor or resistor section 238 and across the supply wires 190 and 194 as by wires 240 and 242. The anode 224 of tube 214 is connected by wire 244 to one end of the coil 246 of a relay 248, the other end of the coil 246 being connected by wire 250 to the positive supply wire 190. Relay 248 includes a switch 252, the movable blade of which is connected directly to the wire 158, and the fixed contact of which is connected as by wire 254 to the positive supply wire.

The lamp 46 is connected by the wire 166 to one end of a resistor 256, the other end of which is connected directly to the supply wire 190, and the wire 168 is connected directly to the supply wire 194.

The device operates as follows: Upon the closure of the switch 192 the amplifier unit is energized and current is supplied to the lamp 46 from the battery 20 through the wire 192, the switch 102, the voltage dropping resistor 256, the wire 166, the lamp 46, the wire 168, the wire 194, and the wire 164. When the light from the lamp 46 falls on the photocell, a current flows from the positive supply wire 190 through resistor 188, wire 154, photocell 104, and the wire 156 to the negative supply wire 194. The voltage applied to the control grid 174 by the photoelectric cell maintains the current flowing from the positive supply wire 190 through wire 226, the anode 186, cathode 180, and the resistor 208 to the negative supply wire 194 at such a minimum value that the voltage drop across the resistor 208 is not sufficient to overcome the negative bias applied by the self-biasing resistor 236, and, therefore, does not permit sufficient current to flow through the coil 246 of the relay 248 to actuate the relay. Hence the switch 252 remains opened and the signal lamp 14 extinguished.

When, by an accumulation of ice, slush, or frost in the chambers formed by the openings 42 and 44, the light passed to the photoelectric cell is reduced by a certain extent, the voltage applied to the control grid 174, relative to the cathode 180, is so varied that the consequent current through the resistor 208 creates a sufficient voltage drop across the resistor to overcome the negative bias of the grid 212, and consequently the plate current of the tube 214, which flows through the relay coil 246, is increased sufficiently to effect closure of the switch 252. Hence, the signal lamp 14 is energized and provides a visual indication of the icing conditions in the air induction system. The pilot will thus be warned by the lighting of the lamp 14 that appropriate measures should be taken to eliminate the ice in the carburetor induction system or to prevent further formation of ice in the system.

It will be evident that in place of, or in addition to, the lamp 14 an ammeter may be substituted in the plate cathode circuit of the tube 214 to provide a constant indication, by the position of the meter needle, of the icing conditions in the carburetor induction system, so that the pilot can know at any instant how much, in a relative sense, ice has accumulated in the carburetor induction system.

The chambers formed by the openings 42 and 44 are of the utmost importance in the proper operation of the ice detector, for they provide, as applicant has discovered, a place for ice to form before ice forms anywhere else in the carburetor induction system, and ice will form or accumulate in these openings prior to its accumulation anywhere else in the system, whether that ice being formed is impact ice, throttle ice, or fuel evaporation ice.

It will be evident that the relay 248 may itself initiate and terminate operation of any known de-icer or heater means for eliminating the ice in the induction system.

Changes may be made in the form, construction, and arrangement of the parts without departing from the spirit of the invention or sacrificing any of its attendant advantages, and the right is hereby reserved to make all such changes as fairly fall within the scope of the following claims.

What I claim is:

1. In a carburetor air induction system, means providing a wall surface defining a passage for air and air-fuel mixtures, means forming a chamber set into said surface and communicating with said passage, means for projecting a beam of rays through said chamber, a ray sensitive means communicating with said chamber to receive light passing through the chamber, said chamber being constructed and arranged to provide a space in which ice forms and accumulates prior to its formation anywhere else in the system under all icing conditions, and a load device actuated by said ray sensitive means upon accumulation of a given amount of ice in said chamber.

2. In a fuel supply system for an airplane engine, pipe means adapted to be connected to the fuel supply system for receiving the air fuel mixtures and adapted to transmit the air fuel mixtures to the engine, said pipe means having oppositely disposed openings therein, a lamp housing mounted on said pipe means, a lamp in said housing aligned with one of said openings, lenses in said housing aligned with said one opening for projecting the light from said lamp as a parallel beam through said one opening and across the air-fuel transmitting passage of said pipe means, a photoelectric cell housing mounted on said pipe means, a photoelectric cell in said last mentioned housing in alignment with the other of said openings, a lens housing mounted on said pipe means, and a lens in said housing positioned to direct the rays of said parallel beam of light received through said other opening onto said photoelectric cell, said openings providing recesses for the accumulation of ice in the path of the light beam.

3. In a fuel supply system for an airplane engine, a hollow fitting directing the fuel mixture to the engine, said fitting having internal angularly related surfaces defining a passage converging in the direction of movement of the fuel mixture, an aperture through said fitting laterally of said passage and opening into said passage at the intersection of said surfaces to provide a chamber in which ice forms prior to its formation elsewhere in the system, means for projecting a beam of light into said chamber, a photoelectric cell mounted to receive the beam of light from said chamber under the control of ice in said chamber, and means controlled by the photoelectric cell and constructed and arranged to indicate the presence of ice in said chamber in an amount indicative of such icing conditions within the system as to constitute a hazard if not removed.

4. In a carburetor air induction system, an arrangement for anticipating the formation of ice in any air passage of said system comprising a carburetor adapter having a passage through which air passes, the wall of the passage having a recess therein extending transversely to the passage to provide a space in which ice accumulates prior to its accumulation in said passage, a ray source and a ray sensitive means constructed and arranged to sense the presence of ice in said recess, and a load device actuated by said ray sensitive means upon detection of ice by said ray sensitive means.

5. In a carburetor air induction system, means for detecting the incipient formation of ice in said system comprising means providing a surface upon which ice forms from the air and air-fuel mixtures in said system and a recess extending inwardly from said surface and at its inner end flush with the surface to provide a space in which ice accumulates prior to its accumulation on said surface, a ray source and ray sensitive means so positioned in relation to said recess that the ice forming in said recess controls the transmission of rays from the source of said ray sensitive means, and a load device actuated by said ray sensitive means upon accumulation of ice on said surface.

KARL E. ROLLEFSON.

REFERENCES CITED

The following references are of record in the file of this patent:

UNITED STATES PATENTS

| Number | Name | Date |
|---|---|---|
| 878,456 | Darwin | Feb. 4, 1908 |
| 1,785,392 | Sawford et al. | Dec. 16, 1930 |
| 2,212,211 | Pfund | Aug. 20, 1940 |
| 2,280,400 | Green | Apr. 21, 1942 |
| 2,338,574 | Cunningham | Jan. 4, 1944 |
| 2,355,014 | Schorn | Aug. 1, 1944 |
| 2,371,259 | Patterson | Mar. 13, 1945 |

OTHER REFERENCES

Publication, L'Aerotecnica, Aug. 1939.
Publication, Electronics Feb. 1932, page 61, Article and figure, "Robot Humidifier."

Certificate of Correction

Patent No. 2,446,885. August 10, 1948.

KARL E. ROLLEFSON

It is hereby certified that error appears in the printed specification of the above numbered patent requiring correction as follows: Column 8, line 75, claim 5, for the words "of said" read *to said*; and that the said Letters Patent should be read with this correction therein that the same may conform to the record of the case in the Patent Office.

Signed and sealed this 30th day of November, A. D. 1948.

[SEAL]

THOMAS F. MURPHY,
*Assistant Commissioner of Patents.*